United States Patent Office 3,398,251
Patented Aug. 20, 1968

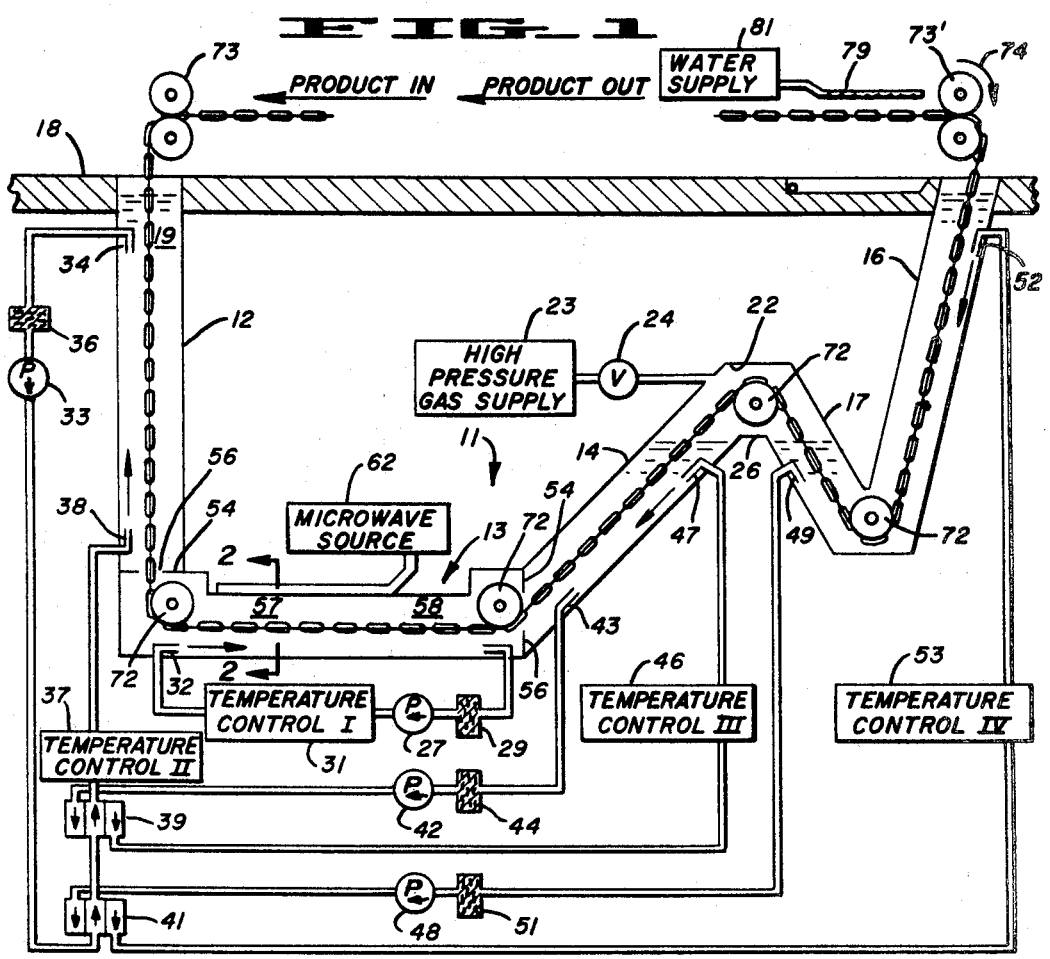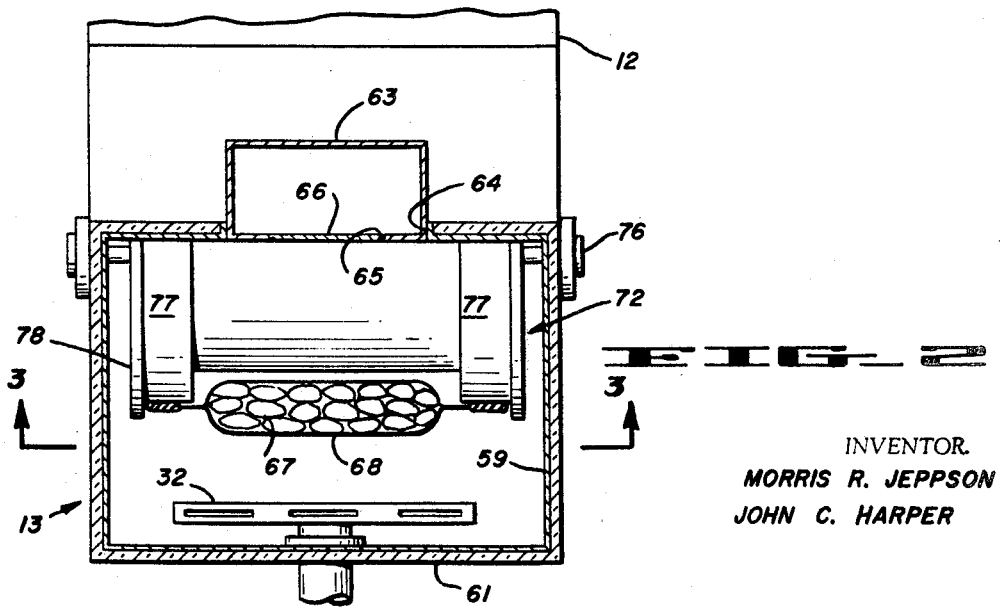

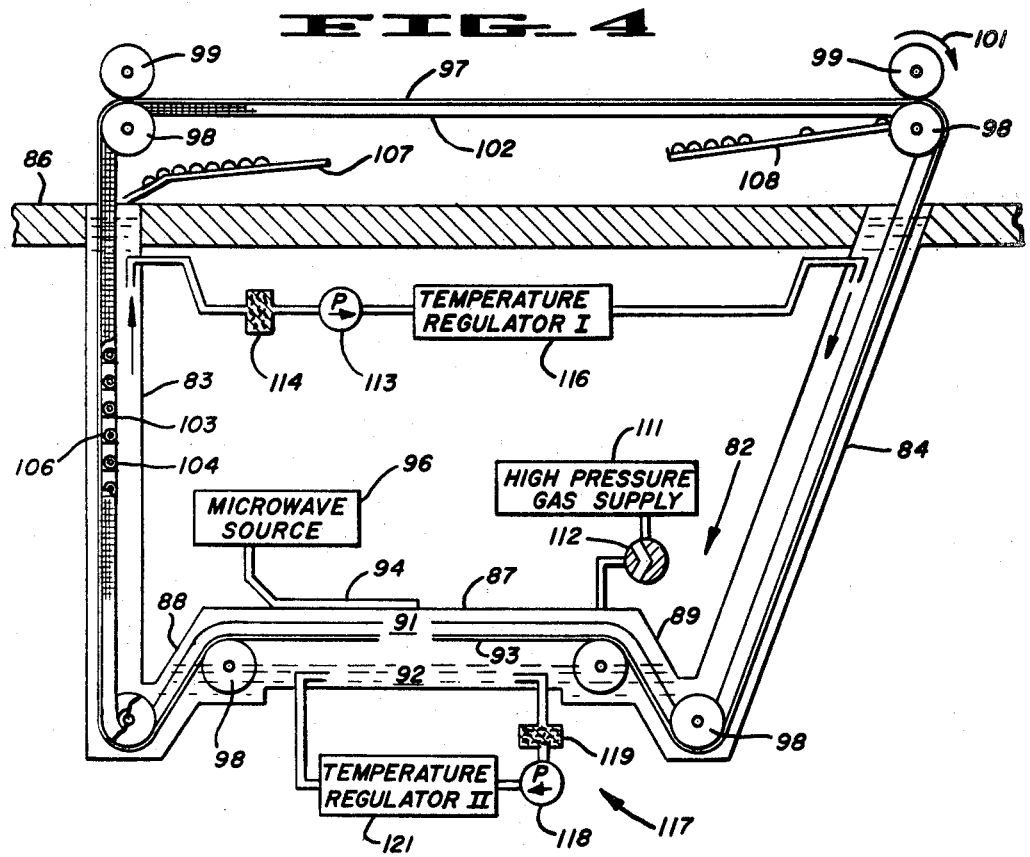
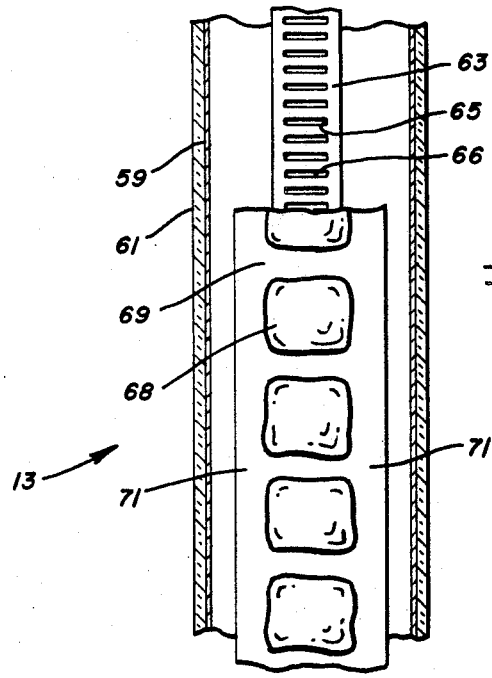

3,398,251
MICROWAVE HEATING OF SUBSTANCES
UNDER HYDROSTATIC PRESSURE
Morris R. Jeppson, Alamo, and John C. Harper, Davis, Calif., assignors to Cryodry Corporation, San Ramon, Calif., a corporation of California
Original application May 4, 1964, Ser. No. 364,405, now Patent No. 3,335,253, dated Aug. 8, 1967. Divided and this application Mar. 15, 1967, Ser. No. 643,757
6 Claims. (Cl. 219—10.41)

ABSTRACT OF THE DISCLOSURE

Microwave heating of substances under pressure by passing said substances through a liquid to a water-free region therein and at a depth to create a hydrostatic pressure on said substances, and then microwave heating said substances in said region.

---

This application is a division of application Ser. No. 364,405, filed May 4, 1964, now U.S. Patent 3,335,253.

This invention relates to the treatment of substances in a high pressure environment and more particularly to a method and apparatus utilizing microwave energy and high pressure conditions to heat food products and the like to high temperatures without adverse effects on the products or product containers.

In the commercial processing of foods it is frequently desirable to heat a product rapidly and uniformly to temperatures above the atmospheric boiling point of water or other constituents thereof. A brief high temperature heat treatment is desirable, for example, in sterilizing many foods prior to, or after, canning. Similarly very high temperatures may be preferable for blanching or cooking certain foods. High temperature food processing of this type generally requires a high pressure environment to prevent boiling, undesired cooking, excess moisture loss, container rupture where the product is heated after canning or packaging, or other adverse effects.

Similar requirements may be present in processing products other than foods. To produce styrafoam, for example, a small amount of detergent-water solution is mixed with the styrene particles and the mixture must be heated to about 250° F. without evaporating the water. Accordingly it is necessary that the heating be conducted in a pressurized environment.

One technique for providing such an environment is that of heating the product after it has been sealed in a rigid high strength container whereby the temperature rise of the natural moisture content of the product acts to build up the internal pressure within the container. An example of such a process is disclosed in copending application Serial No. 274,648, filed April 22, 1963, by the present co-inventor, Morris R. Jeppson, and entitled Process for Sterilizing Food Products. In the process disclosed therein, food products are sterilized by a short exposure to microwaves after being canned in conventional permanent containers, such as glass jars, of a type capable of withstanding a brief internal pressure rise.

The techniques of the above-identified copending application cannot be used if the product is to be heated in an unpackaged condition or if it is packaged in low strength or flexible containers such as plastic packets, tubes, paper cartons or the like. In addition, the technique becomes relatively expensive for particular processes which require an unusual degree of heating as specialized nonstandard containers may be required.

An alternative technique, which is not limited by nature, or absence, of the product container, is that of conducting the heating within a high pressure chamber. In many instances it is highly desirable that the heat treatment be performed on a continuous process basis and thus some form of pressure lock must be provided at opposite ends of the chamber. Various forms of mechanical lock, through which products may be continuously passed into and out of a pressure chamber, are known to the art however such structures tend to be complex and subject to considerable maintenance effort.

The need for mechanical pressure locks may be avoided by submerging the product under a volume of water during heating thus making use of hydrostatic pressure. Hydrostatic cookers of this type are known to the art and consist essentially of a conveyer for carrying the products into and out of an upright water filled tunnel. Heating in these systems is accomplished by passing the product through a hot water or steam region at the lower portion of the tunnel.

As discussed in the above identified copending application, the brief, intense and uniform heating needed for sterilizing certain products without deleterious effects thereto cannot be accomplished by applying heat solely to the surface of the product such as occurs in hot water or steam heating. In order to sterilize the interior of the product, the surface regions thereof must be overheated from the standpoint of optimum quality. In the method of the above identified copending application, the desired high temperature short time heating of the product is effected by microwave energy which provides a uniform heating thereof. However, as previously discussed, the technique requires a pressure environment and is limited to products which have been packaged in high strength containers.

The present invention provides a technique for uniformly heating food products and the like to high temperatures which does not require high strength containers but is applicable to products which are unpackaged or contained in any of various types of relatively weak container. In particular, the invention provides for microwave heating, which may be accompanied by surface heating, under hydrostatically derived pressure.

This result cannot be achieved by simply combining the separate techniques of microwave heating and hydrostatic cooking as presently practiced. Microwave energy preferentially heats water and as most foods contain a substantial moisture content it is this property that makes microwave heating particularly adaptable to food processing. However this property seemingly rules out the practical use of microwave heating in a hydrostatic apparatus. If microwave energy were to be injected into a water filled tunnel, a major portion of the energy would be absorbed by the water with the result that the process would not generally be feasible from the economic standpoint.

Accordingly the present invention provides for the exclusion of water from a lower region of a hydrostatic tunnel while retaining the high pressure environment provided by a volume of liquid above the region and further provides for microwave heating of products in passage through the water free region.

Water is excluded from at least the microwave heating section of the tunnel by substituting a fluid therefor which is non-lossy relative to microwave energy. Mineral oil, for example, is relatively transparent to microwave energy and is sufficiently heavy to produce a substantial hydrostatic pressure head.

Thus in a typical embodiment of the invention, a U-shaped tunnel is provided with a conveyor arranged to carry products therethrough. A microwave source is coupled to the lower section of the tunnel in such a manner as to inject energy into the tunnel in a direction substantially normal to the axis thereof. The walls of the microwave heating section of the tunnel are made of electrically conductive material so that the energy is repeatedly reflected back and forth across the axis of the tunnel and repeatedly passes through the products being conveyed therethrough.

To provide hydrostatic pressure, both upwardly directed legs of the tunnel are filled with liquid and the microwave heating section is filled with a fluid which may not necessarily be the same. Thus in one arrangement the entire tunnel including the heating section is filled with mineral oil. Alternately, one or both of the vertical legs of the tunnel may be filled with water while the heating section contains oil, interchange of the oil with the denser overlying water being prevented by providing a small gas-filled inverted U-shaped loop in the tunnel at the transition point. In still another arrangement, the microwave heating section is in a gas-filled inverted U-shaped loop at the bottom of the tunnel with both upwardly directed legs thereof being filled with water.

More economical processing is obtained if the microwave heating is supplemented by surface applied heat so that the function of the microwave becomes largely that of providing for a uniform temperature rise throughout the product. The invention readily lends itself to such supplemental heating inasmuch as the liquid in the entrance leg of the tunnel may be at a controlled high temperature. Moreover, where a gradual heating of the product is desired, an appropriate temperature gradient may be established in the entrance leg of the tunnel.

Preheating in the above described manner brings the temperature of the surface of the product to the desired level as it enters the microwave heating section. The exposure time in the microwave section may then be arranged to bring the temperature of the interior of the product up to the desired level. Usually a holding period at the high temperature level is required and this also may readily be provided by maintaining the fluid at the high temperature in the section of the tunnel which follows the microwave section.

Product cooling may be accomplished in an essentially similar manner by maintaining a temperature gradient in the liquid column of the exit leg of the tunnel. As cooling may require more time than heating, the exit leg of the tunnel may be less steeply inclined than the entrance leg to provide for a relatively longer travel time therethrough. Forced cooling by such means is frequently necessary where the product is in a container as the heat induced pressure therein must be reduced as the external pressure drops to avoid rupture of the container.

Thus the invention provides a very convenient and practical technique for such processes as the high temperature short time sterilization of foods wherein cooking is minimized and which is not dependent on the use of high strength containers. Meats, vegetables and fruits may be sterilized after packaging in flexible plastic pouches, for example, with a briefer but more intense heat treatment than has heretofore been feasible. Such treatment generally produces a higher quality product from the standpoint of taste, appearance and nutritional content. Additional advantages result in the case of certain specific products. The high temperature treatment has a tenderizing effect on some meats. In the case of fruits and meats, juice loss is minimized owing to the reduced pressure gradient within the product.

It will be evident that the invention is also applicable to the heat treatment of products which are not foods but which are similar in that moisture loss, container failure or other undesirable effect would occur if the heating were conducted at atmospheric pressure.

Accordingly, it is an object of this invention to provide a method and apparatus for heating substances with microwave energy under high pressure conditions.

It is an object of the invention to provide for efficient microwave heating within a hydrostatic pressure chamber.

It is an object of the invention to provide a method and means for rapidly and uniformly heating products above the atmospheric boiling point of constituents thereof without adverse effects.

It is an object of this invention to provide means for heating substances which are packaged in weak or flexible containers to high temperatures without damage thereto.

It is an object of the invention to provide a method and apparatus for rapidly and uniformly heating food products and the like to temperatures above the atmospheric boiling point of water without requiring high strength containers, mechanical pressure locks, or the like for maintaining the necessary high pressure environment.

It is another object of the invention to provide a method and apparatus for the high temperature short time sterilization of foods which is not restricted by strength or rigidity characteristics of the food container or package.

The invention, including further objects and advantages thereof, will be better understood by reference to the following specification and the accompanying drawings of which:

FIGURE 1 is a partially schematic view of a first embodiment of a food processing installation for practicing the invention, FIGURE 2 is a cross section view taken along line 2—2 of FIGURE 1 and showing details of the microwave heating chamber thereof, FIGURE 3 is a partial section view taken along line 3—3 of FIGURE 2, and FIGURE 4 is a partially schematic view of a second form of food processing installation embodying the invention.

Referring now to the drawing, and more particularly to FIGURE 1 thereof, there is shown a continuous process tunnel 11 through which products may be passed on a continuous basis. Tunnel 11 includes a vertical entrance section 12 which continues, at the lower end thereof, into a horizontal microwave heating and holding section 13. A lower product exit section 14 of the tunnel slants upwardly from the end of section 13 opposite section 12 and connects with an upper exit section 16 through a relatively short downwardly slanted transition section 17. For convenience in handling the product, the upper ends of both the entrance section 12 and exit section 16 may be transpierced through an elevated platform or walkway 18.

The essentially U-shaped configuration of the tunnel 11 allows a liquid filling to be retained therein for developing the desired high pressure within the microwave heating section 13. To avoid excessive microwave power loss, at least that portion of the liquid which fills the heating section 13 must be a substance which is not lossy to electromagnetic energy in the frequency range from about 200 megacycles to 10,000 megacycles, the use of water in this section of the tunnel being ruled out by this requirement. Suitable liquids for this purpose include, but are not limited to, mineral oil, transformer oils or vegetable oils.

In the present embodiment, the entrance section 12, heating and holding section 13, and the lower product exit section 14 of the tunnel 11 contain a filling 19 of mineral oil. To avoid the use of an unnecessarily large quantity of relatively expensive oil, the upper product exit section 16 is filled with water 21. As the section 16 is remote from the microwave heating section 13, the water filling 21 does not significantly affect the microwave heating.

To prevent the interchange of oil 19 with the over-lying volume of water 21, a liquid free region 22 is maintained at the juncture of lower exit section 14 with transition section 17. To maintain the region 22, gas from a high pressure supply 23 is admitted to the region through a valve 24. By thus raising the pressure in region 22, the upper level of the liquids in sections 14 and 17 is forced below that of the intervening tunnel wall portion 26 and no liquid interchange can occur. It will be apparent that a similar liquid free region may be established at the entrance portion of the tunnel, by providing a downwardly directed transition section therein, if it should be desired to use water at both ends of the tunnel.

As microwave heating is inherently more expensive than most other methods, it is desirable that conventional heating be employed to heat the surface regions of the product, the function of the microwave being to rapidly and uniformly heat the interior of the product. In addition, it is desirable that the liquid within the microwave heating region be at approximately the required product temperature to prevent the loss of microwave generated heat therefrom. Accordingly means are provided for maintaining the oil 19 in the microwave heating section 13 of the tunnel 11 at the required temperature. In addition, means are provided for maintaining a temperature gradient in the entrance section 12 which increases in the downward direction to gradually bring the product up to the temperature of the microwave section 13 and for maintaining a similar temperature gradient in the tunnel exit sections 14 and 16 to cool the product as it moves upwardly and experiences a progressively diminishing pressure. In the absence of such cooling, product containers might rupture upon being removed from the high pressure region.

To control the temperature of the oil within the heating and holding section 13 of the tunnel 11, a variable flow rate pump 27 withdraws a portion of the oil, through an intake 28 at the output end of section 13 and through a filter 29. The flow from pump 27 passes through a suitable temperature regulating means 31 and is returned to the opposite end of section 13 through an output tabulation 32. Upon returning to tunnel section 13, the circulated oil intermixes with the remainder and thus an appropriate adjustment of the regulator 31 results in control of the temperature of the entire oil content of section 13. The regulator 31 may, in some instances, be of a type capable of cooling, as well as heating, the oil as the heat input to the tunnel section 13 from microwave energy may be greater than the heat loss therefrom.

To maintain the temperature gradient in tunnel entrance section 12, a second pump 33 withdraws oil from the top of section 12 through an intake 34 and filter 36. The flow from pump 33 passes through a second temperature regulator 37 and is returned to the bottom of tunnel section 12 through an outlet 38 thereat. The oil from regulator 37 is fed into the lower end of tunnel section 12 at a temperature approximately equivalent to that of the oil within microwave heating section 13. However, as the oil moves upwardly in tunnel section 12, heat is delivered to the incoming cool product so that the oil temperature progressively decreases and may be close to that of the ambient temperature at the top of the tunnel.

A reverse process occurs at the product output end of the tunnel 11, i.e. heat is transferred from the product to the liquid. Economical operation may be achieved by transferring the heat content of the output tunnel liquid to the entrance section 12 liquid. This is accomplished in this embodiment by passing the oil flow between pump 33 and second temperature regulator 37 through first and second heat exchangers 39 and 41 respectively. As will hereinafter be discussed in more detail, the heated liquids from the output end of the tunnel 11 are also passed through the heat exchangers 39 and 41 to effect the desired heat transfer.

The temperature gradient in the lower tunnel exit section 14 is maintained by a third pump 42 which withdraws oil through an intake 43 at the lower end of section 14 through a filter 44. The flow from pump 42 is partially cooled by passage through heat exchanger 39 and then returned to the upper end of tunnel section 14 through a third temperature regulator 46 and outlet 47. The oil which is fed into the upper end of tunnel section 14 is initially at an intermediate temperature and is subsequently further heated by the product so that it has a temperature approaching that of the oil within microwave heating section 13 at the lower end of the section 14. Thus the function of regulator 46 will generally be that of cooling the oil flow although this is partially accomplished within the heat exchanger 39.

An essentially similar system is employed to maintain the temperature gradient in the upper product exit section 16. Thus a third pump 48 withdraws cooling water 21 from an intake 49 at the upper end of transition section 17 through a filter 51. The outflow from pump 48 is partially cooled by passage through the second heat exchanger 41 and is returned to an outlet 52 at the upper end of tunnel exit section 16 through a fourth temperature regulator unit 53.

Under the usual operating conditions, the water temperature at intake 49 is approximately that of the oil at the upper end of lower exit tunnel section 14 so that there is an approximately continuous temperature gradient throughout both exit sections 14 and 16. The water temperature at the top of upper exit section 16, determined by adjustment of regulator 53, does not generally have to be as low as the ambient atmospheric temperature. In most instances, if the emerging product has been cooled below the boiling point of its constituents, no deleterious effects result.

More precise temperature regulation may be obtained in the above described system if means are provided to reduce the interchange of oil between the several sections of tunnel 11. For example transverse baffles 54 may be disposed in the tunnel 11 at the lower ends of sections 12 and 14, each baffle having an opening 56 just sufficient to pass the particular product undergoing processing.

Referring now to FIGURES 2 and 3 in conjunction with FIGURE 1, the tunnel section 13 includes an initial portion 57 into which microwave is injected to heat the interior of the product and a second holding portion 58 in which the product remains at the desired high temperature inasmuch as heat loss is prevented by the surrounding hot oil 19. To prevent the escape of microwave energy, the inner wall 59 of tunnel section 13, and preferably the remainder of the tunnel 11 as well, is formed of electrical conductor such as stainless steel, copper or aluminum. To minimize the direct loss of heat a layer 61 of thermal insulation is provided around the outside surface of the tunnel 11.

Microwave energy from a suitable source 62 is injected into portion 57 of the tunnel section 13 through a slotted waveguide 63 which extends along the top of the tunnel portion 57 and which fits into a matching opening 64 in inner wall 59 so that the waveguide effectively forms the central portion of the top wall of the tunnel. The side of the waveguide 63 which faces the interior of the tunnel 11 is formed with a series of spaced apart transverse slots 65 each of which radiates an increment of the microwave energy downwardly into the tunnel. The energy is repeatedly reflected back and forth between opposite walls of the tunnel 11 and thus repeatedly passes through the produce therein. With each such passage through the product a portion of the energy is absorbed and converted to heat. The structure and operation of the slotted waveguide 63 microwave input for a heating chamber is described in more detail, and claimed, in copending application Ser. No. 308,284, filed Sept. 11, 1963, by Morris R. Jeppson and Franklin J. Smith and entitled, Power Distribution System for Microwave Process Chambers.

In this embodiment, the oil 19 is prevented from entering the waveguide 63 by closure elements 66 disposed in the slots 65, the elements 66 being formed of dielectric material and therefore being transparent to microwave energy. The waveguide 63 may however be filled with oil and still function in a satisfactory manner.

Product may be carried through the tunnel 11 by any of a variety of conveyor systems, the type selected being dependent on the configuration and characteristics of the particular product to be treated. A unique system is utilized in this embodiment to sterilize foods such as sliced turkey, stews, beef Stroganoff, veal scallopini, etc. 67 after packaging in flexible plastic film packets 68. In particular the packets 68 are formed in a long strip by heat sealing spaced apart quantities of food 67, in an unsterilized condition, between two ribbons of nylon film 69. For added strength, a welt 71 may be formed along the edges of the strip of packets 68 by folding over the edges of the film 59, however the strain on the strip in being pulled through the tunnel 11 is less than would normally be the case owing to the buoyancy of the strip and its contents in the liquid which fills the tunnel.

The strip of food packets 68 is continuously fed into entrance section 12 of the tunnel 11 and removed from the upper exit section 16. A series of rotatable drums 72 are mounted within the tunnel to guide the strip, such drums being at the juncture of sections 12 and 13, the juncture of sections 13 and 14, the juncture of sections 14 and 17, and at the base of upper exit section 16. To support the strip of packets 68 above the entrance section 12, the strip is gripped between two adjacent parallel drums 73 and a similar set of drums 73' engage the strip above the exit section 16. Drive may be applied to drums 73', as indicated by arrow 74, to pull the product through the tunnel 11.

As shown in FIGURE 2 in particular, the drums 72 are journalled within the tunnel 11 by suitable bearings 76 and have end sections 77 of greater diameter than the central portion to contact the welts 71 of the strip of packets 68. Flanges 78 are provided on the drum 72 to hold the strip thereon.

Referring now again to FIGURE 1, a multiple nozzle 79, connected to a water supply 81, may be positioned to spray the strip of food packets 68 as it emerges from the drive drums 73'. The spray provides final cooling and removes any remaining oil from the packets 68.

In operation, the food 67 is packaged as described above and the resultant strip of packets 68 is continuously pulled through the tunnel 11 at a controlled rate by the drive drums 73'. Pumps 27, 33, 42 and 48 and temperature regulators 31, 37, 46 and 53 are operated to provide the described temperature gradients in the tunnel entrance section 12 and exit sections 14 and 16 and to provide the uniform high temperature in section 13. Microwave source 62 is energized to inject energy into the first half of section 13.

Upon moving downwardly through tunnel entrance section 12, the surface of product is gradually heated while the product is subjected to a progressively increasing pressure owing to the hydrostatic head. Thus, assuming that appropriate settings of the temperature regulators have been made, the product is heated above 212° F. without boiling or other disadvantageous results. On moving through the initial portion 57 of the heating section 13, the interior of the product is rapidly heated by microwave from source 62 to a temperature corresponding to that of the surface of the product. The product then remains at the uniform high temperature for the period required to travel through the holding portion 58 of section 13.

The product then travels upwardly through exit sections 14 and 16 and is cooled by the progressively diminishing temperature of the oil 19 and water 21 therein. Upon emerging from upper exit section 21, the product is washed by sprays 79. The individual food packets 68 may then be cut apart and the welts 71 trimmed therefrom.

It will be apparent from the foregoing description that a variety of process temperatures and heating times may be arranged for by appropriate adjustments of the pumps, the temperature regulators and the speed of the drive drums 73'. Specific temperatures and holding times suitable for the high temperature short time sterilization of particular food products are described in the hereinbefore identified copending application Serial No. 274,648.

Referring now to FIGURE 4, an alternate system is shown which requires no oil and which is adapted to process products in any of a variety of containers as well as products which are unpackaged.

A tunnel 82 is provided with a vertical entrance section 83 and an inclined exit section 84, both sections having upper ends which pass through an elevated platform 86. A horizontal microwave heating and holding tunnel section 87 extends between sections 83 and 84 at a level a small distance above the lower ends thereof, sections 83 and 87 being connected by a first inclined transition section 88 and sections 87 and 84 being connected by a second inclined transition section 89.

The horizontal tunnel section 87 is of enlarged cross section relative to the other sections of the tunnel 82 with the upper portion 91 being partitioned from the lower portion 92 by a flat plate 93. Plate 93 and the wall of the horizontal tunnel section 87 are formed of a good electrical and thermal conductor such as copper.

A waveguide 94 extends along the top wall of the initial half of horizontal tunnel section 87 and is coupled to a microwave source 96, the waveguide being adapted to inject microwave downwardly into the upper portion 91 of the tunnel section 87 in the manner previously described.

The product conveyer in this embodiment is a continuous belt 97 which extends through tunnel 82 and between the upper ends thereof above platform 86. Belt 97 is supported by a series of rotatable drums 98 of which individual ones are situated at the top and bottom of entrance and exit sections 83 and 84 and at opposite ends of the horizontal section 87. Additional parallel and adjacent drums 99 are associated with the uppermost drums 98 and rotary drive is applied to at least set thereof as indicated by arrow 101.

Belt 97 is formed with side portions 102 and spaced apart transverse members 103 which extend between the side portions to form a continuous series of pockets 104 along the inside of the belt for receiving, in this example, plastic cans 106 of the product to be treated. To provide for the free circulation of tunnel water around the containers 106, the belt 97 including side portions 102 and transverse members 103 is formed largely of an open mesh or screen material which is preferably a dielectric, glass fiber screen being a suitable material.

Containers 106 are continuously fed into the pockets 104 of belt 97 above the tunnel entrance section 83, an inclined tray 107 being adjacent the inner side of the belt to deliver the containers thereto. Containers 106 drop from the belt 97 after it passes around the drum 98 at the top of tunnel exit section 84 and are received on a second inclined tray 108 disposed thereunder.

To provide hydrostatic pressure, tunnel entrance and exit sections 83 and 84, transition sections 88 and 89, and the lower portion 92 of horizontal section 87 are filled with water 109. Water 109 is kept out of the upper portion 91 of tunnel section 87 by the air or gas entrapped therein, the water level being controllable by admitting high pressure gas thereto from a source 111, or releasing gas therefrom, by means of a valve 112.

A pump 113 withdraws water 109 from the top of entrance tunnel 83, through a filter 114, and discharges into the top of exit section 84 through a water temperature regulating unit 116. Thus a continuous flow through tunnel 82 is maintained, the flow being counter to the direction of movement of the product therethrough.

As in the first embodiment of the invention, it is desirable that there be a uniform high temperature within the horizontal tunnel section 87 and a temperature gradient which increases with depth in both entrance and exit sections 83 and 84. Once established, these conditions are automatically maintained to some extent by the inherent heat transfer characteristics of the system. Thus the relatively cool water delivered to the top of exit section 84 is heated, as it flows downwardly therein, by the countermoving heated product. The water flow thus arrives at horizontal section 87 at a temperature approaching the operating temperature therein. As the water flow moves upwardly through entrance section 83, it is cooled by heat transfer to the incoming product therein.

Due to such factors as incomplete heat exchange between water and product, heat loss through the tunnel walls, the heat input from microwave source 96, etc. the above described automatic temperature control will not generally maintain precisely optimum conditions. Accordingly temperature regulator 116 is utilized to hold the water temperature at the top end of exit section 84 at the desired value. For similar reasons a supplementary water temperature control system 117 is provided at the horizontal tunnel section 87. System 117 includes a pump 118 which withdraws a portion of the water flow through section 87, through a filter 119, and passes the withdrawn flow through a second temperature regulator 121 from which the flow is returned to the tunnel section 87. Thus the desired temperature may be maintained in section 87 irrespective of deviations of the overall system from preferred conditions.

In this embodiment, the flow of high temperature water through the lower portion 92 of tunnel section 87 acts to maintain the temperature of the thermally conducting walls of the tunnel section, and the atmosphere therein, at the desired high temperature so that no significant heat loss occurs from the surface of the product by radiation, convection etc. In some modifications of the invention, the water flow may not pass through the tunnel section 87. The flow may, for example, be through a bypass or separate flows may be circulated through the two end sections of the tunnel. Under these circumstances, means such as electrical heating coils or the like may be employed to heat the walls of the microwave heating chamber 91, or the walls of the chamber can be constructed of lossy material which will cause heating by the microwave power.

In operation, product containers 106 are fed into successive ones of the pockets 104 of belt 97 and are carried downwardly into entrance tunnel section 83. The surface regions of the product are heated in passage through entrance section 83 and the product is subjected to an increasing pressure. The containers 106 are then carried into the first half of upper portion 91 of section 87 where the interior of the product is heated by microwave energy. The product then remains at the elevated temperature while being carried through the terminal half of section 87.

Upon being carried upwardly through exit section 84, the product is cooled while the ambient pressure progressively decreases. Thus the product has been rapidly and uniformly heated to a high temperature, in a high pressure environment, held thereat for a predetermined short period of time, and subsequently cooled.

It will be apparent from the foregoing description that varying forms of apparatus may be utilized to practice the invention. The basic steps for obtaining the advantages of microwave heating under high pressure and on a continuous process basis are that a water free region be maintained beneath a volume of liquid and that the products to be treated be continuously carried downwardly through the liquid and subjected to microwave energy within the water free region. A downwardly increasing temperature gradient is maintained in the volume of liquid and the period required for the passage of the treated product upwardly through the liquid is adjusted so that the product is cooled at least below the boiling point of its constituents prior to emerging from the liquid.

Accordingly, while the invention has been described with respect to certain exemplary embodiments, many variations are possible within the scope of the invention and it is not intended to limit the invention except as defined in the following claims.

What is claimed is:

1. In a method for subjecting substances to high temperatures in a high pressure environment, the steps comprising:
   (a) establishing a downwardly increasing temperature gradient within a volume of liquid,
   (b) maintaining a water free region below the surface of said volume of liquid at a high temperature zone thereof,
   (c) passing said substances downwardly into said liquid and into said water free high temperature region therein,
   (d) exposing said substances to microwave energy while in said water free region, and
   (e) gradually withdrawing said substances upwardly from said water free region through said liquid whereby said substances are cooled as the pressure therearound decreases.

2. In a method for subjecting substances to high temperatures in a high pressure environment as described in claim 1, the further step comprising:
   (f) continuously moving successive increments of said substances downwardly through said liquid and through said water free region and then upwardly through said liquid.

3. In a method for heat treating substances under high pressure conditions, the steps comprising:
   (a) maintaining a gas filled region below the surface of a volume of water,
   (b) electrically shielding said gas filled region from said volume of water,
   (c) transporting said substances downwardly through said volume of water to said gas filled region,
   (d) injecting microwave energy into said substances within said gas filled region, and
   (e) gradually withdrawing said substances from said gas filled region upwardly through said volume of water.

4. In a continuous process for the high temperature short time heat treatment of food products and the like, the steps comprising:
   (a) maintaining a downwardly increasing temperature gradient within a volume of liquid,
   (b) maintaining a water free region within said volume of liquid at a high temperature and high pressure zone therein,
   (c) continuously conveying successive increments of said products downwardly through said volume of liquid and through said water free region thereof,
   (d) exposing said products to microwave energy within said water free region to provide a uniform high temperature throughout said products,
   (e) maintaining said uniform high temperature of said products for a predetermined period of time, and
   (f) subsequently withdrawing said products upwardly through said volume of liquid.

5. In a method for heat treating substances under high pressure conditions, the steps comprising:
   (a) passing said substances through a volume of liquid,
   (b) excluding water from the vicinity of said substances to create a water-free region about said substances while said volume of liquid is disposed so as to effect a hydrostatic pressure in the water-free region, and
   (c) injecting microwave energy into said substances while in the water-free region.

6. In a method for heating substances in a high pressure environment, the steps comprising:
   (a) immersing said substances in a water-free liquid so as to effect a hydrostatic pressure upon said substances,
   (b) injecting microwave energy into said substances while said hydrostatic pressure is asserted upon said substances,
   (c) gradually withdrawing said substances from said liquid and
   (d) cooling said substances in the course of withdrawal from said liquid.

References Cited

UNITED STATES PATENTS

| | | | |
|---|---|---|---|
| 2,585,970 | 2/1952 | Shaw | 219—10.55 X |
| 3,171,009 | 2/1965 | Scheller et al. | 219—10.55 |
| 3,261,959 | 7/1966 | Connell et al. | 219—10.55 |
| 3,335,253 | 8/1967 | Jeppson et al. | 219—10.55 |

RICHARD M. WOOD, *Primary Examiner.*

L. H. BENDER, *Assistant Examiner.*